3,661,927
2-IMIDAZOLIN-2-YL ALKYLENE DERIVATIVES OF BENZAZOCINES AND BENZOTHIAZOCINES
Dusan Zivkovic, Brussels, Belgium, assignor to UCB Société Anonyme, Brussels, Belgium
No Drawing. Filed Feb. 5, 1969, Ser. No. 796,920
Claims priority, application Great Britain, Feb. 7, 1968, 6,049/68
Int. Cl. C07d *49/34, 51/36*
U.S. Cl. 260—309.6    11 Claims

ABSTRACT OF THE DISCLOSURE

Heterocyclic compounds with anti-arrhythmic, psychostimulant, antispasmodic, cardiovascular, antidepressive and antihistaminic properties having the formula

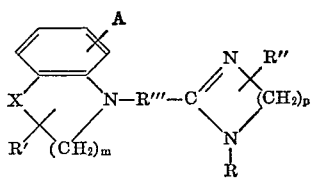

wherein

A is hydrogen, halogen, cyano, alkyl, alkoxy, acyl or haloalkyl,
X is methylene or sulfur,
R, R', R" are each hydrogen or alkyl,
R''' is a straight or branched chain alkylene radical having 1 to 4 carbon atoms,
m is a whole number from 2 to 4, and
p is a whole number from 2 to 5, the pharmaceutically acceptable acid addition salts thereof, and methods for preparing the same.

---

The present invention is concerned with new heterocyclic compounds which possess a medicinal utility and with the methods for preparing the same.

The new heterocyclic compounds according to the present invention can be represented by the general formula:

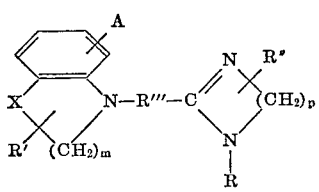

wherein

A is hydrogen, halogen, cyano, alkyl, e.g., lower alkyl, alkoxy, acyl or haloalkyl,
X is methylene or sulfur,
R, R', R", which may be the same or different, are each hydrogen or alkyl, e.g., lower alkyl,
R''' is a straight or branched chain alkylene radical having 1 to 4 carbon atoms,
m is a whole number from 2 to 4, and
p is a whole number from 2 to 5, and the pharmaceutically acceptable acid addition salts thereof.

The new compounds according to the present invention can be prepared, for example, by one of the following methods:

(a) condensation of an N-Y-alkyl-benzazocycloalkane of the formula:

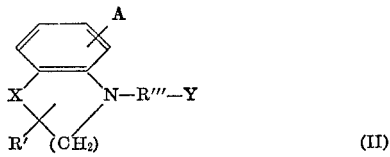

wherein A, X, R', R''' and m have the same meanings as above and Y is cyano, imino-ether, imino-thioether, imido-halide, amido, thioamido or amidino, with an alkylene-diamine of the formula:

$$H_2N-(CH_2)_p-NH-R \qquad (III)$$

wherein R and p have the same meanings as above and wherein one of the hydrogen atoms of the $(CH_2)_p$ group is replaced by R", R" having the same meaning as above.

(b) condensation of a benzazocycloalkane of the formula

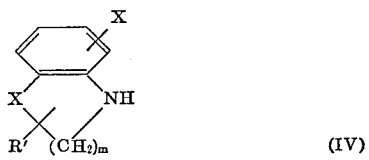

wherein A, X, R' and m have the same meanings as above, with a derivative of the formula

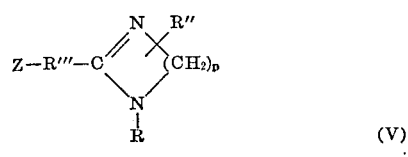

wherein R, R", R''' and p have the same meanings as above and Z is a halogen atom or a group with equivalent reactivity, for example, a p-toluene-sulfonate group.

The new compounds according to the invention are pharmacological agents having powerful anti-arrhythmic, psychostimulant and antipasmodic properties; they are also cardiovascular, antidepressive and antihistaminic agents.

ANTI-ARRHYTHMIC ACTIVITY

This is shown by measuring the rise in ventircular fibrillation threshold produced in dog by myocardiac application of alternative stimuli (50 Herz) as described by E. Vanremoortere (Acta Cardiologica, XXIII, (1968), 23–67). In this test, a so-called "multiplication coefficient" is sought, which interprets the rise in value of the ventricular fibrillation threshold caused by the administration of the tested drug. When this coefficient is 1, the drug is considered to be inactive. The higher the coefficient value, the higher is the activity of the drug.

In this test, the following compounds A to H according to the invention were used:

(A) 1-[(4-methyl-2-imidazolin-2-yl)-methyl]-1,2,3,4,5,6-hexahydro-1-benzazocine;
(B) 9-methyl-1-[(4-methyl-2-imidazolin-2-yl)-methyl]-1,2,3,4,5,6-hexahydro-1-benzazocine;
(C) 8-chloro-6-[(1-isopropyl-2-imidazolin-2-yl)-methyl]-2,3,4,5-tetrahydro-1,6-benzothiazocine;
(D) 8-chloro-6-[3-(2-imidazolin-2-yl)-2-methyl-propyl]-2,3,4,5-tetrahydro-1,6-benzothiazocine;
(E) 9-fluoro-1-[(2-imidazolin-2-yl)-methyl]1,2,3,4,5,6-hexahydro-1-benzazocine;
(F) 1-[(1-methyl-2-imidazolin-2-yl)-methyl]-1,2,3,4,5,6-hexahydro-1-benzazocine;

(G) 1-[(1,4,5,6-tetrahydro-2-pyrimidyl)-methyl]-1,2,3,4,5,6-hexahydro-1-benzazocine;

(H) 1-[3-(2-imidazolin-2-yl)-2-methyl-propyl]-1,2,3,4,5,6-hexahydro-1-benzazocine.

In this test, as well as in the subsequent comparative tests, the drug was administered intravenously. In the following table, the compound used, its acute $LD_{50}$ toxicity in rat (intravenous administration), the dose used (in mg./kg.) and the coefficient obtained (the mean value between brackets is that of at least 10 tests) are given.

| Compound: | $LD_{50}$ | Dose | Coefficient | (Mean value) |
|---|---|---|---|---|
| A | 38 | 2 | 1.5 | |
|   |    | 3 | 2-5 | (3.5) |
|   |    | 5 | 2.5-7 | (4) |
| B | 46 | 5 | 4 | |
| C | 48 | 5 | 3-4 | (3.5) |
| D | 66 | 5 | 4 | |
| E | 87 | 5 | 2-3 | (2.5) |
| F | 49 | 5 | 2-3 | (2.5) |
| G | 51 | 5 | 2-3 | (2.5) |
| H |    | 5 | 2 | |

For comparison, two known cardiac depressants, quinidine sulfate and procainamide [p-amino-N-(2-diethylaminoethyl)-benzamide], give the following results:

| Compound | Dose (mg./kg.) | Coefficient |
|---|---|---|
| Quinidine sulfate | 10 | 1 |
|   | 15-25 | 1-4 |
| Procainamide | 20-30 | 2.5-5 |

A comparison shows that (a) all compounds according to the invention prove to be active, (b) they reach the depressant activity of the two commercial compounds of reference at doses that are 5 to 10 times less, and (c) their active dose lies far below their toxic dose. They consequently are of very great interest for regulating the various cardiac rhythm troubles.

PSYCHOSTIMULANT ACTIVITY

For these tests, the following two compounds according to the invention were used:

(I) 1-[1-(2-imidazolin-2-yl)-ethyl]-1,2,3,4,5,6-hexahydro-1-benzazocine;

(J) 9-chloro-1-[(2-imidazolin-2-yl)-methyl]-1,2,3,4,5,6-hexahydro-1-benzazocine.

(a) Test of the general behaviour of the mouse

The method of S. Irwin "General philosophy and methodology of screening: a multidimentional approach," Gordon Research Conference on Medicinal Chemistry—Colley Jr. College, New London, Aug. 3–7, 1959, is applied.

In this test, compounds I and J proved to be stimulant to motor activity as well as central nervous system activity, after intravenous administration of the following doses:

7.7 mg./kg. for I.
8 mg./kg. for J.

(b) The turning rod test

The test of N. W. Dunham and T. S. Miya (J. Amer. Pharm. Assoc. 46 (1957), 208–209) is applied in rat by intraperitoneal administration of compounds I and J. The following results are obtained.

| Compound | $ED_{50}$ (mg./kg.) | $LD_{50}$ (mg./kg.) |
|---|---|---|
| I | 8 | 66 |
| J | 4 | 55 |
| Dexamphetamine | 9.8 | 21.7 |

NOTE.—$ED_{50}$=efficaceous dose; $LD_{50}$=Lethal dose.

This table shows that the active dose is lower than that of dexamphetamine (d-alpha-methylphenethylamine), which is a well known psychostimulant. Another advantage is the lower toxicity of the compounds according to the invention.

ANTISPASMODIC ACTIVITY

The following compounds according to the invention are used:

Compound D: mentioned above.
Compound K: 8-chloro-6-[3-(2-imidazolin-2-yl)-propyl]-2,3,4,5-tetrahydro-1,6-benzothiazocine.

(a) Inhibition of intestinal propulsion test

This test is described by P. A. J. Janssen and A. Jageneau (J. Pharm. Pharmacol. 9, (1957), 381).

By intravenous administration in mouse of compound D, as compared to atropine sulfate and papaverine, two powerful antispasmodics, the following results are obtained:

| Compound: | $ED_{50}$ (mg./kg.) |
|---|---|
| D | 6 |
| Atropine sulfate | 20 |
| Papaverine | 45 |

The activity of D proves to be 3 to 7 times as high as that of the known compounds.

(b) Barium chloride test

This is carried out according to the method of D. Wellens (Arzneimittelforschung, 17 (1966), 495–497). In this test, compound K proves to be 7.5 times as active as papaverine. It consequently has a considerable myotropic antispasmodic effect.

The compounds according to the invention are administered orally as well as parenterally, in form of solid or liquid compositions comprising the usual vehicles. The unit dose varies, preferably, from 25 to 100 mg.

The following examples are given for the purpose of illustrating the present invention.

EXAMPLE 1

1-[(2-imidazolin-2-yl)-methyl]-1,2,3,4-tetrahydroquinoline

A mixture of 23.3 g. 1-cyanomethyl-1,2,3,4-tetrahydroquinoline and 12.2 g. anhydrous ethylene-diamine is heated for 4 hours at 110–115° C. in the presence of 5 drops of carbon disulfide. About 80 ml. benzene are then added to the reaction mixture and the benzene solution is washed two or three times with 100 ml. amounts of water. The benzene solution is dried over anhydrous sodium sulfate and the solvent then evaporated on a waterbath under vacuum. The evaporation residue, after crystallization from petroleum ether (B.P. 40–60° C.), melts at 91–92° C.

Analysis.—Calcd. for $C_{15}H_{17}N_3$ (percent): N, 19.51. Found (percent): N, 19.56.

The corresponding hydrochloride, after recrystallization from isopropanol, melts at 275–276° C. (instantaneously).

Analysis.—Calcd. for $C_{13}H_{17}N_3 \cdot HCl$ (percent): N, 16.69; Cl$^-$, 14.08. Found (percent): N, 16.65; Cl$^-$ 14.22.

EXAMPLE 2

1-[(2-imidazolin-2-yl)-methyl]-2,3,4,5-tetrahydro-1-benzazepine

This compound is prepared in a manner analogous to that described in Example 1 starting from a mixture of 20 g. 1-cyanomethyl-2,3,4,5-tetrahydro-1-benzazepine and 9.8 g. anhydrous ethylene-diamine, in the presence of 5 drops of carbon disulfide; the reaction mixture is heated to 100–105° C. for 5 hours. The product has a melting point of 67–68° C., after recrystallization from petroleum ether (B.P. 40–60° C.).

Analysis.—Calcd. for $C_{14}H_{19}N_3$ (percent): N, 18.32. Found (percent): N, 18.22.

The corresponding hydrochloride, after recrystallization from isopropanol, malts at 211–212° C.

*Analysis.*—Calcd. for $C_{14}H_{19}N_3 \cdot HCl$ (percent): N, 15.81; Cl⁻, 13.34. Found (percent: N, 15.73; Cl⁻, 13.54.

The 1-cyanomethyl-2,3,4,5 - tetrahydro-1-benzazepine used as starting material was prepared in the following manner: a mixture of 37.8 g. 2,3,4,5-tetrahydro-(1H)-1-benzazepine, 39 g. chloroacetonitrile and 32 g. anhydrous sodium carbonate was heated to 85.90° C. for 9 hours. About 120 ml. benzene were then added to the reaction mixture, the solution was filtered and the filtrate washed three times with 100 ml. amounts of water. The organic phase was dried over anhydrous sodium sulfate and then evaporated on a water bath under vacuum. The evaporation residue was then distilled. It had a boiling point of 108–110° C./0.001 mm. Hg.

*Analysis.*—Calcd. for $C_{12}H_{14}N_2$ (percent): N, 15.04. Found (percent): N, 15.00.

EXAMPLE 3

1-[(2-imidazolin-2-yl₇-methyl]-1,2,3,4,5,6-hexahydro-1-benzazocine

This compound is prepared in a manner analogous to that described in Example 1 starting from a mixture of 27 g. 1-cyanomethyl-1,2,3,4,5,6-hexahydro-1-benzazocine and 12.2 g. anhydrous ethylene-diamine, in the presence of 10 drops of carbon disulfide; the reaction mixture is heated to 130–135° C. for 4 hours. The product has a melting point of 96–97° C.

*Analysis.*—Calcd. for $C_{15}H_{21}N_3$ (percent): N, 17.26. Found (percent): N, 17.00.

The corresponding hydrochloride, after recrystallization from isopropanol, melts at 197–198° C.

*Analysis.*—Calcd. for $C_{15}H_{21}N_3 \cdot HCl$ (percent): N, 15.02; Cl⁻, 12.67. Found (percent): N, 14.93; Cl⁻, 12.74.

The 1-cyanomethyl-1,2,3,4,5,6-hexahydro-1-benzazocine used as starting material was prepared in the following manner: a mixture of 24.2 g. 1,2,3,4,5,6 - hexahydro-1-benzazocine, 20. g. chloroacetonitrile and 18.5 g. anhydrous sodium carbonate was heated to 90–95° C. for 6 hours. The product was isolated in a manner analogous to that described in Example 2 for the benzepine. The product has a boiling point of 92–94° C./0.001 mm. Hg and, after recrystallization from petroleum ether (B.P. 40–60° C.), has a melting point of 51–52° C.

*Analysis.*—Calcd. for $C_{13}H_{16}N_2$ (percent): N, 13.98. Found (percent): N, 14.00.

EXAMPLE 4

1-[(2-imidazoline-2-yl)-methyl]-1,2,3,4,5,6-hexahydro-1-benzazocine

This compound, which has already been described in Example 3, can also be prepared by reacting 20.8 g. 1,2,3,4,5,6-hexahydro-1-benzazocine and 10 g. 2-chloromethyl-2-imidazoline hydrochloride in 50 ml. ethanol by progressively heating under reflux the solution thus obtained. The alcohol is eliminated by distillation until the reaction mixture has attained an internal temperature of 115–120° C. After heating for 4 hours at this temperature, the reaction mixture is allowed to cool, and 50 ml. water are added. The base is liberated by the addition of 20 ml. of a 40% solution of sodium hydroxide, and is extracted with about 100 ml. benzene. The benzene solution is then washed twice with 100 ml. Amounts of water, thereafter dried over anhydrous sodium sulfate and then evaporated to dryness on a waterbath under vacuum. The residue is distilled. The product has a boiling point of 118–120° C./0.001 mm. Hg and, after recrystallization from petroleum ether (B,P. 40–60° C.), has a melting point of 96–97° C.

The compound thus obtained does not depress the melting point when admixed with the compound obtained according to Example 3.

*Analysis.*—Calcd. for $C_{15}H_{21}N_3$ (percent): N, 17.26. Found (percent): N, 17.43.

EXAMPLE 5

1-[(4-methyl-2-imidazolin-2-yl)-methyl]-1,2,3,4,5,6-hexahydro-1-benzazocine

This compound was prepared in a manner analogous to that described in Example 1, by heating to 120–125° C. for 4 hours a mixture of 39.2 g. 1-cyanomethyl-1,2,3,4,5,6-hexahydro-1-benzazocine and 24 g. propylene-1,2-diamine in the presence of 10 drops of carbon disulfide. The compound obtained has a boiling point of 138–140° C./0.001 mm. Hg and, after recrystallization from petroleum ether (B.P. 40–60° C.) has a melting point of 88–89° C.

*Analysis.*—Calcd. for $C_{16}H_{23}N_3$ (percent): N, 16.3. Found (percent): N, 16.28.

The corresponding hydrochloride, after recrystallization from isopropanol, has a melting point of 199–200° C.

*Analysis.*—Calcd. for $C_{16}H_{23}N_3 \cdot HCl$ (percent): N, 14.30; Cl⁻, 12.06. Found (percent): N, 14.52; Cl⁻, 12.14.

EXAMPLE 6

1-[(4-methyl-2-imidazolin-2-yl)-methyl]-1,2,3,4,5,6-hexahydro-1-benzazocine

This compound, which has already been described in Example 5, can also be prepared, in a manner analogous to that described in Example 4, starting from 13.3 g. 1,2,3,4,5,6-hexahydro-1-benzazocine and 10.1 g. 2-chloromethyl-4-methyl-2-imidazoline hydrochloride in 50 ml. ethanol. The compound obtained has a boiling point of 137–140° C./0.001 mm. Hg and a melting point of 87.5–88.5° C.

The compound thus obtained does not depress the melting point when admixed with the compound obtained according to Example 5.

*Analysis.*—Calcd. for $C_{16}H_{23}N_3$ (percent): N, 16.32. Found (percent): N, 16.72.

EXAMPLE 7

1-[(1,4,5,6-tetrahydro-2-pyrimidyl)-methyl]-1,2,3,4,5,6-hexahydro-1-benzazocine

This compound is prepared in a manner analogous to that described in Example 1 starting from 30 g. 1-cyanomethyl - 1,2,3,4,5,6-hexahydro-1-benzazocine and 17 g. propylene-1,3-diamine in the presence of 10 drops of carbon disulfide, the reaction mixture being heated to 100–105° C. for 4 hours. The compound obtained, after recrystallization from petroleum ether, has a melting point of 88–89° C.

*Analysis.*—Calcd. for $C_{16}H_{23}N_3$ (percent): N, 16.32. Found (percent): N, 16.52.

The corresponding hydrochloride, after recrystallization from isopropanol, has a melting point of 182–183° C.

*Analysis.*—Calcd. for $C_{16}H_{23}N_3 \cdot HCl$ (percent): Cl⁻, 12.06. Found (percent): Cl⁻, 12.16.

EXAMPLE 8

9-chloro-1-[(2-imidazolin-2-yl)-methyl]-1,2,3,4,5,6-hexahydro-1-benzazocine

This compound is prepared in a manner analogous to that described in Example 1 by heating at 100–105° C. for 4 hours a mixture of 31.7 g. 9-chloro-1-cyanomethyl-1,2,3,4,5,6-hexahydro-1-benzazocine and 12.2 g. anhydrous ethylene diamine in the presence of 10 drops of carbon disulfide. The compound obtained, after recrystallization from petroleum ether (B.P. 40–60° C.), has a melting point of 95–96° C.

*Analysis.*—Calcd. for $C_{15}H_{20}ClN_3$ (percent): N, 15.12; Cl, 12.76. Found (percent): N, 15.02; Cl, 12.78.

The corresponding hydrochloride, after recrystallization from isopropanol, has a melting point of 252–253° C.

*Analysis.*—Calcd. for $C_{15}H_{20}ClN_3 \cdot HCl$ (percent): N, 13.37; Cl (total), 22.56; Cl⁻, 11.28. Found (percent): N, 13.34; Cl (total), 22.63; Cl, 11.32.

The 9 - chloro-1-cyanomethyl-1,2,3,4,5,6-hexahydro-1-benzazocine used as starting material was prepared as follows: using the method described in Example 3 for the preparation of the corresponding non-chlorinated compound, a mixture of 116 g. 9-chloro-1,2,3,4,5,6-hexahydro-1-benzazocine, 90 g. chloroacetonitrile and 73.5 g. anhydrous sodium carbonate is heated to 110° C. for 10 hours. The product obtained has a boiling point of 107–109° C./0.001 mm. Hg.

*Analysis.*—Calcd. for $C_{13}H_{15}ClN_2$ (percent): N, 11.93; Cl, 15.10. Found (percent): N, 12.02; Cl, 15.02.

The 9-chloro-1,2,3,4,5,6-hexahydro-1-benzazocine used for the preparation of this starting material is, in turn, prepared in the following manner: 17.8 g. 9-chloro-3,4,5,6-tetrahydro-(1H)-1-benzazocin-2-one in 230 ml. ether is boiled under reflux for 15 hours in the presence of 5 g. lithium aluminium hydride. The product obtained has a boiling point of 80–82° C./0.001 mm. Hg.

*Analysis.*—Calcd. for $C_{11}H_{14}ClN$ (percent): N, 7.15; Cl, 18.11. Found (percent): N, 7.02; Cl, 18.23.

EXAMPLE 9

9-chloro-1-[(1,4,5,6-tetrahydro-2-pyrimidyl)-methyl]-1,2,3,4,5,6-hexahydro-1-benzazocine This compound is prepared in a manner analogous to that described in Example 1 by heating to 100–110° C. for a period of 4 hours a mixture of 31.7 g. 9-chloro-1-cyanomethyl-1,2,3,4,5,6-hexahydro-1-benzazocine and 15 g. propylene-1,3-diamine in the presence of 10 drops of carbon disulfide. The compound obtained, after recrystallization from ether, has a melting point of 93–95° C.

*Analysis.*—Calcd. for $C_{16}H_{22}ClN_3$ (percent): N, 14.40; Cl, 12.15. Found (percent): N, 14.44; Cl, 12.15.

The corresponding hydrochloride, after recrystallization from isopropanol, has a melting point of 247–248° C.

*Analysis.*—Calcd. for $C_{16}H_{22}ClN_3 \cdot HCl$ (percent): N, 12.80; Cl, (total), 21.60; Cl⁻, 10.80. Found (percent): N, 12.73; Cl, (total), 21.40; Cl⁻, 10.78.

EXAMPLE 10

9-fluoro-1-[(2-imidazolin-2-yl)-methyl]-1,2,3,4,5,6-hexahydro-1-benzazocine

This compound is prepared in a manner analogous to that described in Example 1 by heating to 100–105° C. for 4 hours a mixture of 20 g. 1-cyanomethyl-9-fluoro-1,2,3,4,5,6-hexahydro-1-benzazocine and 8.6 g. anhydrous ethylene-diamine in the presence of 5 drops of carbon disulfide. The compound obtained, after recrystallization from petroleum ether (B.P. 40–60° C.), has a melting point of 124–126° C.

*Analysis.*—Calcd. for $C_{15}H_{20}FN_3$ (percent): N, 16.07. Found (percent): N, 15.92.

The corresponding hydrochloride, after recrystallization from isopropanol, has a melting point of 226–228° C.

*Analysis.*—Calcd. for $C_{15}H_{20}FN_3 \cdot HCl$ (percent): N, 14.11; Cl⁻, 11.90. Found (percent): N, 14.01; Cl⁻, 12.16.

The 1 - cyanomethyl-9-fluoro-1,2,3,4,5,6-hexahydro-1-benzazocine used as starting material was prepared in the following manner; using the method described in Example 3 for the non-fluorinated derivative: a mixture of 21 g. 9-fluoro-1,2,3,4,5,6-hexahydro-1-benzazocine, 17.8 g. chloroacetonitrile and 14.5 g. anhydrous sodium carbonate is heated to 110–115° C. for 8 hours. The compound obtained has a boiling point of 96–98° C./0.001 mm. Hg.

*Analysis.*—Calcd. for $C_{13}H_{15}FN_2$ (percent): N, 12.86. Found (percent): N, 12.84.

The 9 - fluoro-1,2,3,4,5,6-hexahydro-1-benzazocine is prepared by the reduction of 27.6 g. 9-fluoro-3,4,5,6-tetrahydro-(1H)-1-benzazocin-2-one in 450 ml. ether with 8.3 g. lithium aluminium hydride by boiling under reflux for 20 hours. The compound obtained has a boiling point of 56–59° C./0.001 mm. Hg.

*Analysis.*—Calcd. for $C_{11}H_{14}FN$ (percent): N, 7.81. Found (percent): N, 7.60.

The 9 - fluoro-3,4,5,6-tetrahydro-(1H)-1-benzazocin-2-one is obtained by slowly introducing 32.8 g. of the oxime of 3-fluoro-6,7,8,9-tetrahydrobenzocyclohepten-5-one into 380 g. polyphosphoric acid heated to 115° C. The temperature of the reaction mixture is increased to 130° C. and, after heating for 15 minutes, it is poured into about 2.5 liters of iced water. The precipitate obtained is filtered off, liberally washed with water, then with petroleum ether (B.P. 40–60° C.) and dried. The compound obtained has a melting point of 191–192° C.

*Analysis.*—Calcd. for $C_{11}H_{12}FNO$ (percent): N, 7.25. Found (percent): N, 7.32.

The oxime of 3-fluoro-6,7,8,9-tetrahydrobenzocyclohepten-5-one is prepared from 48.1 g. of the ketone, 54 ml. pyridine and 37.7 g. hydroxylamine hydrochloride in 60 ml. ethanol at 95° C., heating under reflux being continued for a period of 3 hours. The product obtained melts at 114–115° C.

*Analysis.*—Calcd. for $C_{11}H_{12}FNO$ (percent): N, 7.25. Found (percent): N, 7.14.

The 3-fluoro-6,7,8,9-tetrahydrobenzocyclohepten-5-one is prepared by slowly introducing, over the course of 15 to 20 hours, 215 g. 5-(p-fluorophenyl)-pentanoyl chloride, dissolved in 850 ml. carbon disulfide, into a suspension of 220 g. aluminium chloride in 660 ml. carbon disulfide boiling under reflux. When the addition is finished, reflux boiling is continued for 1 hour. After cooling the reaction mixture is an ice salt mixture, there are added 1.5 liters dilute hydrochloric acid (500 ml. of concentrated acid in 1 liter water). The organic phase is separated off, evaporated on a water bath and the residue, taken up in 500 ml. benzene, is washed successively with 500 ml. water, 500 ml. of a 5% solution of sodium hydroxide and 500 ml. water. After evaporation of the solvent, the residue is distilled. The compound obtained has a boiling point of 84–86° C./0.001 mm. Hg.

The 5-p-fluorophenyl-pentanoic acid is prepared by the malonic synthesis method, followed by hydrolysis and decarboxylation.

In this case, to a solution of 335 g. diethyl malonate in 750 ml. anhydrous dioxan, there is added 79.3 g. commercial sodium hydride in the form of an about 50% by weight suspension in paraffin, which had been washed with benzene. After the formation of the corresponding sodium derivative, there are added 334.5 g. 3-p-fluorophenyl-1-bromopropane. After boiling under reflux for 6 hours, the reaction mixture is concentrated on a water bath under vacuum, then treated in the cold with about 1 liter water. Thereafter, the reaction mixture is extracted with 1 liter benzene, the benzene solution washed with water, dried over anhydrous sodium sulfate and the solvent evaporated off on a water bath under vacuum. The evaporation residue is distilled. It has a boiling point of 120–125° C./0.001 mm. Hg.

438 g. 2-(3-fluorophenyl-propyl)-malonic acid diethyl ester are slowly introduced into a boiling solution of 438 g. potassium hydroxide in 438 ml. water. The boiling and the addition are regulated in such a manner that the alcohol formed slowly distills off azeotropically. When the addition is finished and the temperature of the distillate has increased to 94–96° C., there is added 1 liter water. The reaction mixture is cooled and the desired organic acid liberated by the addition of 650 ml. concentrated hydrochloric acid. The organic acid is extracted with ether, the ethereal solution is washed with water, dried over anhydrous sodium sulfate and evaporated to dryness. The product obtained as a melting point of 130–131° C.

By progressively heating the 2-(3-p-fluorophenyl-propyl)-malonic acid thus obtained to 170° C. until termination of the evolution of gas, there is obtained 5-(p-fluorophenyl)-pentanoic acid which, after recrystallization from petroleum ether (B.P. 40–60° C.), has a melting point of 75–76° C.

The 3-p-fluorophenyl-1-bromopropane is obtained by boiling under reflux for 20 hours a mixture of 248 g. 3-p-fluorophenyl-propan-1-ol in 980 ml. 48% hydrobromic acid. The reaction mixture is poured into 2 liters water, extracted with benzene and the benzene solution is washed with water, dried over anhydrous sodium sulfate and evaporated on a water bath under vacuum. The product obtained has a boiling point of 113–115° C./12 mm. Hg.

Analysis.—Calcd. for $C_9H_{10}BrF$ (percent): Br, 36.81. Found (percent): Br, 36.60.

EXAMPLE 11

1-[1-(2-imidazolin-2-yl)-ethyl]-1,2,3,4,5,6-hexahydro-1-benzazocine

This compound is prepared in a manner analogous to that described in Example 4 starting from 32.25 g. 1,2,3,4,5,6-hexahydro-1-benzazocine and 25.8 g. 2-(1-bromoethyl)-imidazoline hydrobromide in 85 ml. ethanol. The product obtained has a boiling point of 121–125° C./0.001 mm. Hg and, after recrystallization from petroleum ether (B.P. 40–60° C.), has a melting point of 111–112° C.

Analysis.—Calcd. for $C_{16}H_{23}N_3$ (percent): N, 16.32. Found (percent): N, 16.43.

The corresponding hydrochloride, recrystallized from isopropanol, melts at 211–212° C.

Analysis.—Calcd. for $C_{16}H_{23}N_3 \cdot HCl$ (percent): N, 14.30; Cl⁻, 12.06. Found (percent): N, 14.46; Cl⁻, 12.30.

EXAMPLE 12

6-[(2-imidazolin-2-yl)-methyl]-2,3,4,5-tetrahydro-1,6-benzothiazocine

This compound is prepared in a manner analogous to that described in Example 1 by heating to 90–95° C. for 5 hours a mixture of 22 g. 6-cyanomethyl-2,3,4,5-tetrahydro-1,6-benzothiazocine and 9.5 g. anhydrous ethylene-diamine, in the presence of 5 drops of carbon disulfide. The compound obtained, after recrystallization from ether, has a melting point of 85–86° C.

Analysis.—Calcd. for $C_{14}H_{19}N_3S$ (percent): N, 16.07; S, 12.26. Found (percent): N, 16.48; S, 12.24.

The corresponding hydrochloride, after recrystallization from isopropanol, melts at 205° C.

Analysis.—Calcd. for $C_{14}H_{19}N_3S \cdot HCl$ (percent): N, 14.10; S, 10.76; Cl⁻, 11.90. Found (percent): N, 14.12; S, 10.56; Cl⁻, 12.94.

The 6 - cyanomethyl-2,3,4,5-tetrahydro-1,6-benzothiazocine used as starting material was prepared in a manner analogous to that described in Example 1 for the corresponding non-sulfur-containing compound by heating for 6 hours at 85° C. a mixture of 26.9 g. 2,3,4,5,6-tetrahydro-(6H)-1,6-benzothiazocine, 20 g. chloroacetonitrile and 18.5 g. anhydrous sodium carbonate. The product obtained has a boiling point of 127–129° C./0.001 mm. Hg.

Analysis.—Calcd. for $C_{12}H_{14}N_2S$ (percent): N, 12.83; S, 14.68. Found (percent): N, 12.76; S, 14.67.

EXAMPLE 13

6-[(4-methyl-2-imidazolin-2-yl)-methyl]-2,3,4,5-tetrahydro-1,6-benzothiazocine

This compound is prepared in a manner analogous to that described in Example 1 by heating to 105–110° C. for 5 hours a mixture of 22 g. 6-cyanomethyl-2,3,4,5-tetrahydro-1,6-benzothiazocine and 14 g. propylene-1,2-diamine in the presence of 5 drops of carbon disulfide. The crude product obtained was converted into the corresponding hydrochloride and, after recrystallization from isopropanol, melts at 163–164° C.

Analysis.—Calcd. for $C_{15}H_{21}N_3S \cdot HCl$ (percent): N, 13.47; S, 10.28; Cl⁻, 11.36. Found (percent): N, 13.49; S, 10.26; Cl⁻, 11.56.

EXAMPLE 14

8-chloro-6-[(2-imidazolin-2-yl) methyl]-2,3,4,5-tetrahydro-1,6-benzothiazocine

This compound is prepared in a manner analogous to that described in Example 1 by heating to 100–105° C. for 4 hours a mixture of 25 g. 8-chloro-6-cyanomethyl-2,3,4,5-tetrahydro-1,6-benzothiazocine and 9.5 g. anhydrous ethylene-diamine in the presence of 5 drops of carbon disulfide. The compound obtained, after recrystallization from petroleum ether (B.P. 40–60° C.), has a melting point of 130–132° C.

Analysis.—Calcd. for $C_{14}H_{18}ClN_3S$ (percent): N, 14.17; S, 10.84; Cl, 11.98. Found (percent): N, 14.26; S, 10.76; Cl, 12.14.

The corresponding hydrochloride, after recrystallization from isopropanol, melts at 214–215° C.

Analysis.—Calcd. for $C_{14}H_{18}ClN_3S \cdot HCl$ (percent): N, 12.64; S, 9.64; Cl (total), 21.34; Cl⁻, 10.67. Found (percent): N, 12.49; S, 9.64; Cl (total), 21.85; Cl⁻, 10.85.

The 8-chloro-6-cyanomethyl - 2,3,4,5 - tetrahydro-1,6-benzothiazocine used as starting material was prepared in a manner analogous to that described in Example 3 for 1-cyanomethyl - 1,2,3,4,5,6 - hexahydro - 1 - benzazocine by heating to 85–90° C. for a period of 10 hours a mixture of 42.7 g. 8 - chloro - 2,3,4,5 - tetrahydro - (6H) - 1,6,-benzothiazocine, 26.6 g. chloroacetonitrile and 24.6 g. anhydrous sodium carbonate in 20 ml. xylene. The product obtained has a boiling point of 142–145° C./0.001 mm. Hg.

Analysis.—Calcd. for $C_{12}H_{13}ClN_2S$ (percent): N, 11.08; S, 12.68; Cl, 14.02. Found (percent): N, 10.87; S, 12.74; Cl, 13.94.

EXAMPLE 15

8-chloro-6-[(4-methyl-2-imidazolin-2-yl)-methyl]-2,3,4,5-tetrahydro-1,6-benzothiazocine This compound is prepared in a manner analogous to that described in Example 1 by heating to 100–105° C. for a period of 4 hours a mixture of 30 g. 8-chloro-6-cyanomethyl - 2,3,4,5 - tetrahydro - 1,6 - benzothiazocine and 15 g. propylene-1,2,-diamine in the presence of 5 drops of carbon disulfide. The corresponding hydrochloride, after recrystallization from isopropanol melts at 155–156° C.

Analysis.—Calcd. for $C_{15}H_{20}ClN_3S \cdot HCl$ (percent): N, 12.13; S, 9.25; Cl (total), 20.41; Cl⁻, 10.20. Found (percent): N, 12.17; S, 9.22; Cl (total), 20.28; Cl⁻, 10.28.

EXAMPLE 16

8-methyl-6-[(2-imidazolin-2-yl)-methyl]-2,3,4,5-tetrahydro-1,6-benzothiazocine

This compound is prepared in a manner analogous to that described in Example 1 by heating to 110–115° C. for a period of 5 hours a mixture of 23.8 g. 6-cyanomethyl-8 - methyl - 2,3,4,5, - tetrahydro-1,6,-benzothiazocine and 9 g. anhydrous ethylene-diamine in the presence of 5 drops of carbon disulfide. The compound obtained, after recrystallization from petroleum ether (B.P. 40–60° C.), has a melting point of 95–97° C.

The corresponding hydrochloride, prepared in isopropanol, melts at 213–215° C.

Analysis.—Calcd. for $C_{15}H_{21}N_3S \cdot HCl$ (percent): N, 13.14; S, 10.28; Cl⁻, 11.36. Found (percent): N, 13.14; S, 10.04; Cl⁻, 11.45.

The 6 - cyanomethyl - 8 - methyl - 2,3,4,5-tetrahydro-1,6-benzothiazocine used as starting material was prepared in a manner analogous to that described in Example 3 for 1-cyanomethyl - 1,2,3,4,5,6 - hexahydro-1-benzazocine by heating at 90–95° C. for 8 hours a mixture of 27 g. 8 - methyl - 2,3,4,5 - tetrahydro-(6H)-1,6-benzothiazocine, 21.2 g. chloroacetonitrile and 17.2 g. anhydrous sodium carbonate. The compound obtained has a boiling point of 138–142° C./0.1 mm. Hg.

*Analysis.*—Calcd. for $C_{13}H_{16}N_2S$ (percent): N, 12.05; S, 13.75. Found (percent): N, 11.80; S, 13.30.

EXAMPLE 17

8-chloro-6-[3-(2-imidazolin-2-yl)-propyl]-2,3,4,5-tetrahydro-1,6-benzothiazocine This compound is prepared in a manner analogous to that described in Example 1 by heating to 105–110° C. for a period of 4 hours a mixture of 25.3 g. 6-(3-cyanopropyl) - 8 - chloro - 2,3,4,5 - tetrahydro - 1,6 - benzothiazocine and 8.6 g. anhydrous ethylene-diamine in the presence of 6 drops of carbon disulfide. The compound obtained has a boiling point of 190–195° C./0.001 mm. Hg and, after recrystallization from petroleum ether (B.P. 40–60° C.), has a melting point of 92–93° C.

*Analysis.*—Calcd. for $C_{16}H_{22}ClN_3S$ (percent): N, 12.74; S, 9.71; Cl, 10.74. Found (percent): N, 12.86; S, 9.87; Cl, 10.73.

The corresponding hydrochloride, after recrystallization from isopropanol, melts at 164–165° C.

*Analysis.*—Calcd. for $C_{16}H_{22}ClN_3S \cdot HCl$ (percent): N, 11.66; S, 8.89; Cl (total), 19.66; Cl⁻, 9.83. Found (percent): N, 11.38; S, 8.87; Cl (total), 19.75; Cl⁻, 9.88.

The 6-(3-cyanopropyl) - 8 - chloro - 2,3,4,5 - tetrahydro-1,6-benzothiazocine used as starting material was prepared in the manner described in Example 3 for 1-cyanomethyl - 1,2,3,4,5,6 - hexahydro - 1 - benzazocine by heating to 100–105° C. for a period of 15 hours a mixture of 32 g. 8-chloro-2,3,4,5-tetrahydro - (6H) - 1,6-benzothiazocine, 31.1 g. 4-chlorobutyronitrile and 18.5 g. anhydrous sodium carbonate. The product obtained has a boiling point of 144–146° C./0.001 mm. Hg and, after recrystallization from petroleum ether (B.P. 40–60° C.), has a melting point of 48–49° C.

*Analysis.*—Calcd. for $C_{14}H_{17}ClN_2S$ (percent): N, 9.99; Cl, 12.62. Found (percent): N, 9.96; Cl, 12.82.

EXAMPLE 18

8-chloro-6-[1-(2-imidazolin-2-yl)-ethyl]-2,3,4,5-tetrahydro-1,6-benzothiazocine

This compound is prepared in a manner analogous to that described in Example 4 starting from 42.75 g. 8-chloro-2,3,4,5 - tetrahydro - (6H) - 1,6-benzothiazocine and 25.8 g. 2-(1-bromoethyl)-imidazoline hydrobromide in 85 ml. ethanol. The product obtained has a boiling point of 155–158° C./0.001 mm. Hg. and a melting point of 99–101° C.

*Analysis.*—Calcd. for $C_{15}H_{20}ClN_3S$ (percent): N, 13.56; S, 10.31; Cl, 11.44. Found (percent): N, 13.66; S, 10.20; Cl, 11.46.

The corresponding hydrochloride has a melting point of 139°–141° C.

*Analysis.*—Calcd. for $C_{15}H_{20}ClN_3S \cdot HCl$ (percent): N, 12.10; S, 9.25; Cl (total), 20.47; Cl⁻, 10.23. Found (percent): N, 11.81; S, 9.24; Cl (total), 20.50; Cl⁻, 10.30.

EXAMPLE 19

1-[(1-methyl-2-imidazolin-2-yl)-methyl]-1,2,3,4,5,6-hexahydro-1-benzazocine

This compound is prepared in a manner analogous to that described in Example 1 from 20.2 g. 1-cyanomethyl-1,2,3,4,5,6 - hexahydro - 1 - benzazocine and 14.1 g. N-methyl-ethylene-diamine in the presence of 5 drops of carbon disulfide. The base obtained, after crystallization from ether, melts at 82–83° C.

The corresponding hydrochloride, after crystallization from isopropanol, has a melting point of 205–207° C.

*Analysis.*—Calcd. for $C_{16}H_{23}N_3 \cdot HCl$ (percent): N, 14.29; Cl⁻, 12.06. Found (percent): N, 14.24; Cl⁻, 12.44.

EXAMPLE 20

8-chloro-6-[(1-isopropyl-2-imidazolin-2-yl)-methyl]-2,3,4,5-tetrahydro-1,6-benzothiazocine A mixture of 22.5 g. 8-chloro-6-cyanomethyl-2,3,4,5-tetrahydro-1,6-benzothiazocine and 17.1 g. N-isopropyl-ethylene-diamine, in presence of 5 drops of carbon disulfide, is heated for 5 hours at 115–120° C. 50 ml. benzene are then added and the base is extracted with dilute hydrochloric acid (20 ml. concentrated acid+40 ml. water). The acid solution is alkalized by addition of sodium hydroxide and the liberated base is extracted with benzene. The benzenic solution is washed three times with its volume of water, then it is dried over anhydrous sodium sulfate and evaporated on a waterbath under reduced pressure.

The base is converted to the corresponding hydrochloride which, after recrystallization from isopropanol, melts at 232–233° C.

*Analysis.*—Calcd. for $C_{17}H_{24}ClN_3S \cdot HCl$ (percent): N, 11.22; S, 8.56; Cl (total), 18.94; Cl⁻, 9.47. Found (percent): N, 11.30; S, 8.70; Cl (total), 18.96; Cl⁻, 9.91.

EXAMPLE 21

1-[(1-ethyl-2-imidazolin-2-yl)-methyl]-1,2,3,4,5,6-hexahydro-1-benzazocine

This compound has been prepared in a manner analogous to that described in Example 20 from 16.9 g. 1-cyanomethyl - 1,2,3,4,5,6 - hexahydro-1-benzazocine and 14.1 g. N-ethyl-ethylene-diamine in presence of 5 drops of carbon disulfide.

The corresponding hydrochloride, after crystallization from isopropanol, melts at 146–147° C.

*Analysis.*—Calcd. for $C_{17}H_{25}N_3 \cdot HCl$ (percent): N, 13.64; Cl⁻, 11.51. Found (percent): N, 13.30; Cl⁻ 11.84.

EXAMPLE 22

8-chloro-6-[(1-ethly-2-imidazolin-2-yl)-methyl]-2,3,4,5-tetrahydro-1,6-benzothiazocine This compound has been prepared in a manner analogous to that described in Example 20 from 22.5 g. 8-chloro-6-cyanomethyl - 2,3,4,5 - tetrahydro-1,6-benzothiazocine and 14.9 g. N-ethyl-ethylene-diamine in presence of 5 drops of carbon disulfide. The base, after crystallization from petroleum ether (B.P. 60–90° C.), melts at 81–82° C.

The corresponding hydrochloride, after crystallization from isopropanol, melts at 189–190° C.

*Analysis.*—Calcd. for $C_{16}H_{22}ClN_3S \cdot HCl$ (percent): N, 11.66; S, 8.89; Cl (total), 19.66; Cl⁻ 9.83. Found (percent): N, 11.52; S, 9.14; Cl (total), 18.96; Cl⁻ 10.27.

EXAMPLE 23

1-[3-(2-imidazolin-2-yl)-propyl]-1,2,3,4,5,6-hexahydro-1-benzazocine

This compound has been prepared in a manner analogous to that described in Example 20 from 26.9 g. 1-(3-cyano - propyl)-1,2,3,4,5,6-hexahydro-1-benzazocine and 10.6 g. ethylene-diamine in presence of 5 drops of carbon disulfide.

The corresponding hydrochloride, after crystallization from isopropanol, melts at 140–141° C.

*Analysis.*—Calcd. for $C_{17}H_{25}N_3 \cdot HCl$ (percent): N, 13.64; Cl⁻ 11.51. Found (percent): N, 13.56; Cl⁻ 12.24.

The 1-(3-cyano-propyl) - 1,2,3,4,5,6 - hexahydro - 1-benzazocine used as starting material has been prepared by heating at 120–125° C. for 20 hours a mixture of 24.2 g. of 1,2,3,4,5,6-hexahydro-benzazocine, 31.1 g. 4-chlorobutyronitrile and 18.5 g. anhydrous sodium carbonate in presence of 20 ml. xylene. Isolation is carried out as described in Example 2. The product had a boiling point of 125–128° C./0.001 mm. Hg.

*Analysis.*—Calcd. for $C_{15}H_{20}N_2$ (percent): N, 12.22. Found (percent): N, 12.10.

EXAMPLE 24

8-chloro-6-[3-(2-imidazolin-2-yl)-2-methyl-propyl]-2,3,4,5-tetrahydro-1,6-benzothiazocine This compound has been prepared in a manner analogous to that described in Example 20 by heating to 145–150° C. for 15 hours a mixture of 24.9 g. 8-chloro-6-(3-cyano-2-methyl-propyl)-2,3,4,5-tetrahydro - 1,6 - benzothiazocine and 8 g. ethylene-diamine in presence of 5 drops of carbon disulfide.

The corresponding hydrochloride, after crystallization from isopropanol, melts at 228–230° C.

*Analysis.*—Calcd. for $C_{17}H_{24}ClN_3S.HCl$ (percent): N, 11.22; S, 8.56; Cl (total), 18.94; Cl⁻ 9.47. Found (percent): N, 11.24; S, 8.62; Cl (total), 18.44; Cl⁻ 9.80.

The 8-chloro-6(3-cyano-2-methyl-propyl)-2,3,4,5-tetrahydro-1,6-benzothiazocine has been prepared in a manner analogous to that described in Example 2 by heating to 160–170° C. for 20 hours a mixture of 32 g. 8-chloro-2,3,4,5-tetrahydro-1,6-(6H)-benzothiazocine and 50 g. of 4-chloro-3-methyl-butyronitrile in presence of 18.5 g. anhydrous sodium carbonate. The product had a boiling point of 155–160° C./0.001 mm. Hg.

EXAMPLE 25

8-chloro-6-[(2-imidazolin-2-yl)-methyl]-3-methyl-2,3,4,5-tetrahydro-1,6-benzothiazocine This compound has been prepared in a manner analogous to that described in Example 20 from 26.6 g. 8-chloro-6-cyanomethyl-3-methyl - 2,3,4,5 - tetrahydro-1,6-benzothiazocine and 9 g. ethylene-diamine in presence of 5 drops of carbon disulfide. The corresponding hydrochloride, after crystallization from isopropanol, melts at 178–179° C.

*Analysis.*—Calcd. for $C_{15}H_{20}ClN_3S.HCl$ (percent): N, 12.13; S, 9.25; Cl (total), 20.47; Cl⁻ 10.24. Found (percent): N, 12.30; S, 9.38; Cl (total), 20.10; Cl⁻, 10.54.

The 8 - chloro-6-cyanomethyl-3-methyl-2,3,4,5-tetrahydro-1,6-benzothiazocine used as starting material had been prepared in a manner analogous to that described in Example 2 by heating to 85–90° C. for 15 hours a mixture of 45.4 g. 8-chloro-3-methyl-2,3,4,5-tetrahydro-1,6-benzothiazocine, 30.2 g. chloroacetonitrile and 25 g. anhydrous sodium carbonate in presence of 20 ml. toluene. The product had a melting point of 150–155° C./0.001 mm. Hg.

EXAMPLE 26

9-methyl-1-[4-methyl-2-imidazolin-2-yl)-methyl]-1,2,3,4,5,6-hexahydro-1-benzazocine This compound has been prepared in a manner similar to that described in Example 20 from 18.2 g. 1-cyanomethyl-9-methyl-1,2,3,4,5,6-hexahydro - 1 - benzazocine and 12 g. propylene-1,2-diamine in presence of 5 drops of carbon disulfide. The base had a boiling point of 130–134° C./0.001 mm. Hg.

The corresponding hydrochloride, after crystallization from isopropanol, melts at 227–228° C.

*Analysis.*—Calcd. for $C_{17}H_{25}N_3.HCl$ (percent): N, 13.64; Cl⁻, 11.51. Found (percent): N, 13.65; Cl⁻, 11.65.

The 1 - cyanomethyl-9-methyl-1,2,3,4,5,6-hexahydro-1-benzazocine, used as starting material, had been prepared as described in Example 2 by heating to 115–120° C. for 10 hours a mixture of 58 g. 9-methyl-1,2,3,4,5,6-hexahydro-1-benzazocine, 50 g. chloroacetonitrile and 48 g. anhydrous sodium carbonate in presence of 20 ml. xylene. The product had a boiling point of 115–117° C./0.001 mm. Hg.

*Analysis.*—Calcd. for $C_{14}H_{18}N_2$ (percent): N, 13.07. Found (percent): N, 12.94.

The 9-methyl-1,2,3,4,5,6-hexahydro-1-benzazocine had been prepared by the reduction of 9-methyl-3,4,5,6-tetrahydro-(1H)-1-benzazocin-2-one by means of lithium aluminium hydride in ether. The product had a boiling point of 72–73° C./0.001 mm. Hg.

*Analysis.*—Calcd. for $C_{12}H_{17}N$ (percent): N, 7.99. Found (percent): N, 8.18.

The 9 - methyl-3,4,5,6-tetrahydro-(1H)-1-benzazocin-2-one had been prepared by introducing 115 g. of the oxime of 3-methyl-6,7,8,9-tetrahydro-benzocycloheptene-5-one (M.P. 149–150° C.) slowly into 1150 g. polyphosphoric acid, preheated to 110–115° C. The mixture is mechanically stirred for another half hour at 130° C. then is left to cool to 90° C. It is then decomposed by pouring into iced water (2 liters water+kg. ice). The obtained precipitate is filtered and liberally washed with water. After drying, the product had a melting point of 178–179° C.

*Analysis.*—Calcd. for $C_{12}H_{15}NO$ (percent): N, 7.41. Found (percent): N, 7.38.

EXAMPLE 27

9-chloro-1-[(4-methyl-2-imidazolin-2yl)-methyl]-1,2,3,4,5,6-hexahydro-1-benzazocine This compound has been prepared in a manner similar to that described in Example 20 from 20 g. of 9-chloro-1-cyanomethyl-1,2,3,4,5,6-hexahydro-1-benzazocine and 12 g. propylene-1,2-diamine in presence of 5 drops of carbon disulfide. The product had a boiling point of 160–170° C./0.005 mm. Hg.

The corresponding hydrochloride, after crystallization from isopropanol, melts at 230–231° C.

*Analysis.*—Calcd. for $C_{16}H_{22}ClN_3.HCl$ (percent): N, 12.80; Cl (total), 21.60; Cl⁻, 10.80. Found (percent): N, 13.08; Cl (total), 22.15; Cl⁻, 11.07.

EXAMPLE 28

1-[3-(2-imidazolin-2-yl)-2-methyl-propyl]-1,2,3,4,5,6-hexahydro-1-benzazocine

This compound has been prepared in a manner analogous to that described in Example 20 by heating to 130–135° C. for 5 hours a mixture of 15 g. 1-(3-cyano-2-methyl-propyl)-1,2,3,4,5,6 - hexahydro-1-benzazocine and 7.2 g. ethylene-diamine in presence of 5 drops of carbon disulfide. The base obtained had a boiling point of 150–155° C./0.001 mm. Hg.

The corresponding hydrochloride, after crystallization from isopropanol, melts at 204–205° C.

*Analysis.*—Calcd. for $C_{18}H_{27}N_3.HCl$ (percent): N, 13.05; Cl⁻, 11.01. Found (percent): N, 13.24; Cl⁻, 11.13.

The 1-(3-cyano - 2 - methyl-propyl)-1,2,3,4,5,6-hexahydro-1-benzazocine had been prepared, as described in Example 23 for 1-(3-cyano-propyl)-1,2,3,4,5,6-hexahydro-1-benzazocine, by heating to 160° C. for 15 hours a mixture of 25.1 g. 1,2,3,4,5,6-hexahydro-1-benzazocine, 35.3 g. 4-chloro-3-methyl-butyronitrile and 22 g. sodium carbonate in presence of 20 ml. xylene. The product had a boiling point of 128–130° C./0.001 mm. Hg.

EXAMPLE 29

1-[(1-isopropyl-2-imidazolin-2-yl)-methyl]-1,2,3,4,5,6-hexahydro-1-benzazocine

This compound has been prepared as described in Example 20 by heating to 145–150° C. for 12 hours a mixture of 16.9 g. 1-cyanomethyl-1,2,3,4,5,6-hexahydro-1-benzazocine and 16.2 g. N-isopropyl-ethylene-diamine in presence of 5 drops of carbon disulfide. The corresponding hydrochloride, after crystallization from isopropanol, melts at 191–192° C.

*Analysis.*—Calcd. for $C_{18}H_{27}N_3.HCl$ (percent): N, 13.05; Cl⁻, 11.01. Found (percent): N, 12.91; Cl⁻, 11.10.

I claim:
1. A member selected from the group consisting of
(a) a compound of the formula

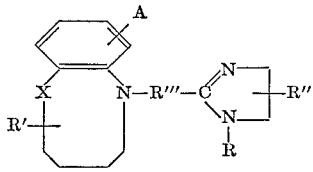

wherein
  A is a member selected from the group consisting of hydrogen, halogen, cyano and lower alkyl,
  X is a member selected from the group consisting of methylene and sulfur,
  each of R, R' and R'' is a member selected from the group consisting of hydrogen and lower alkyl, and
  R''' is alkylene of 1 to 4 carbon atoms, and
(b) a pharmaceutically acceptable acid addition salt of (a).

2. 1-[(4-methyl - 2 - imidazolin-2-yl)-methyl]-1,2,3,4,5,6-hexahydro-1-benzazocine.

3. 9-methyl-1-[(4-methyl - 2-imidazolin-2-yl)-methyl]-1,2,3,4,5,6-hexahydro-1-benzazocine.

4. 8-chloro-6-[(1-isopropyl - 2 - imidazolin-2-yl)-methyl]-2,3,4,5-tetrahydro-1,6-benzothiazocine.

5. 8-chloro-6-[3-(2-imidazolin - 2 - yl) - 2 - methyl-propyl]-2,3,4,5-tetrahydro-1,6-benzothiazocine.

6. 9-fluoro-1-[(2-imidazolin - 2 - yl)-methyl]-1,2,3,4,5,6-hexahydro-1-benzazocine.

7. 1-[(1-methyl - 2 - imidazolin-2-yl)-methyl]-1,2,3,4,5,6-hexahydro-1-benzazocine.

8. 1-[3-(2-imidazolin - 2 - yl)-2-methyl-propyl]-1,2,3,4,5,6-hexahydro-1-benzazocine.

9. 1-[1-(2 - imidazolin - 2 - yl)-ethyl]-1,2,3,4,5,6-hexahydro-1-benzazocine.

10. 9-chloro-1-[(2-imidazolin - 2 - yl)-methyl]-1,2,3,4,5,6-hexahydro-1-benzazocine.

11. 8-chloro-6-[3-(2-imidazolin - 2 - yl) - propyl] - 2,3,4,5-tetrahydro-1,6-benzothiazocine.

References Cited

UNITED STATES PATENTS

| | | | |
|---|---|---|---|
| 2,751,393 | 6/1956 | Schindler | 260—309.6 |
| 3,312,691 | 4/1967 | Werner | 260—309.6 |
| 3,483,185 | 12/1969 | Tokolics et al. | 260—239 BB |
| 3,117,124 | 1/1964 | Krapcho et al. | 260—327 B |
| 3,423,401 | 1/1969 | Forest | 260—239 BB |
| 3,361,750 | 1/1968 | Krapcho | 260—327 B |
| 3,332,951 | 7/1967 | Rossi et al. | 260—239 BB |

FOREIGN PATENTS

| | | | |
|---|---|---|---|
| 1,473,839 | 2/1967 | France | 260—239 BB |

NATALIE TROUSOF, Primary Examiner

U.S. Cl. X.R.

260—239 BB, 243 R, 256.4 H, 256.5 R, 283 R, 283 CN, 288 R, 327 R, 327 B, 475 SC, 514 R; 424—244, 246, 251, 258, 273, 275